(12) United States Patent
Kim

(10) Patent No.: US 6,765,598 B2
(45) Date of Patent: *Jul. 20, 2004

(54) METHOD AND APPARATUS FOR ENABLING SELECTION IN AN ON-SCREEN MENU

(75) Inventor: Phil-Tae Kim, Seoul (KR)

(73) Assignee: Samsung Electronics Co., Ltd., Suwon-si (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/427,680

(22) Filed: Oct. 27, 1999

(65) Prior Publication Data

US 2003/0038894 A1 Feb. 27, 2003

(30) Foreign Application Priority Data

Oct. 27, 1998 (KR) .......................................... 98-45005

(51) Int. Cl.[7] .................................................. G09G 5/00
(52) U.S. Cl. ..................................... 345/857; 345/858
(58) Field of Search ................................ 345/764, 810, 345/814, 829, 841, 844, 856–862; 348/569

(56) References Cited

U.S. PATENT DOCUMENTS

| | | | | |
|---|---|---|---|---|
| 4,772,882 A | * | 9/1988 | Mical ........................... | 345/823 |
| 4,987,411 A | * | 1/1991 | Ishigami ...................... | 345/159 |
| 5,504,500 A | * | 4/1996 | Garthwaite et al. ......... | 345/157 |
| 5,673,087 A | * | 9/1997 | Choi et al. ................... | 348/511 |
| 5,838,386 A | * | 11/1998 | Kim ............................. | 348/569 |
| 5,870,079 A | * | 2/1999 | Hennessy .................... | 345/159 |
| 6,088,031 A | * | 7/2000 | Lee et al. ..................... | 345/810 |
| 6,262,709 B1 | * | 7/2001 | Masuda et al. .............. | 345/467 |

FOREIGN PATENT DOCUMENTS

| | | | |
|---|---|---|---|
| JP | 01-276194 | 11/1989 | |
| JP | 02-090312 | 3/1990 | |
| JP | 08-249846 | 3/1990 | |
| JP | 05-333840 | 12/1993 | |
| JP | 06-205238 | 7/1994 | |
| JP | 07-152490 | 6/1995 | |
| JP | 07-160426 | * 6/1995 | ........... G06F/3/033 |
| JP | 07-288965 | 6/1995 | |
| JP | 11-085402 | 3/1999 | |

OTHER PUBLICATIONS

*Image Display Device*—inventor (Saito Mitsumasa)—publication date Dec. 17, 1993—publication No. 05333840—application No. 04166781.

*Method for Controlling Cursor*—inventor (Kurokawa Atsushi)—publication date Jun. 16, 1995—publication No. 07152490—application No. 05296688.

Notification of Reasons for Rejection mailed Jul. 3, 2001 issued by the Japanese Patent Office and English Translation.

* cited by examiner

*Primary Examiner*—John Cabeca
*Assistant Examiner*—Tadesse Hailu
(74) *Attorney, Agent, or Firm*—Robert E. Bushnell, Esq.

(57) ABSTRACT

A method and apparatus for selecting an on-screen menu is provided. In the method, the speed of movement of a pointer between icons of different levels is made faster than the speed of movement of the pointer between icons of the same level.

19 Claims, 5 Drawing Sheets

METHOD AND APPARATUS FOR ENABLING SELECTION IN AN ON-SCREEN MENU

CLAIM OF PRIORITY

This application makes reference to, incorporates the same herein, and claims all benefits accruing under 35 U.S.C. §119 from my application METHOD AND APPARATUS FOR SELECTING IN ON-SCREEN MENU filed with the Korean Industrial Property Office on Oct. 27 27, 1998 and there duly assigned Serial No. 45005/1998.

BACKGROUND OF THE INVENTION

1. Field of the Invention

The present invention relates to a method and apparatus for selecting in an on-screen menu, and more particularly, to a method and apparatus for selecting in an on-screen menu, by which the menu selection time is shortened.

2. Related Art

In a conventional on-screen menu selection method, the speed of an on-screen pointer which moves between icons of the same level is kept consistent with, that is, the same as, that of an on-screen pointer which moves between icons of different levels, thereby selecting a desired menu screen.

SUMMARY OF THE INVENTION

It is therefore an object of the present invention to provide an improved apparatus and method for selecting in an on-screen menu.

It is a further object of the present invention to provide an apparatus and method in which the menu selection is more efficient.

It is also an object of the present invention to provide an apparatus and method in which the menu selecting time is shortened.

To achieve these objectives, the present invention provides an on-screen menu selecting method in which the menu selection time is shortened by making the speed of movement of a pointer between icons of different levels faster than that of movement of the pointer between icons of the same level. Here, the on-screen menu is displayed at multiple levels.

The on-screen menu selecting method further includes a first determination step of determining the direction in which the pointer is moving; a second determination step of determining whether there is a menu that is displayed in the direction determined in the first determination step; and a step of controlling the pointer to move fast in the determined direction, if it is determined in the second determination step that a menu is displayed.

In the first determination step, the direction in which a pointer is moving is determined by calculating a predetermined direction angle on the basis of the direction of movement, determined from the change in coordinate values, of a current placed pointer, and the predetermined direction angle is ±60°.

To achieve the objectives, the present invention also provides an on-screen menu selecting apparatus including: a key operation unit having a remote controller and a key operator of a panel, particularly, having an on-screen pointer movement key for moving an on-screen pointer; an on-screen menu generator for generating an on-screen menu; an on-screen pointer moving unit for moving the on-screen pointer in response to the movement of the on-screen pointer movement key; an on-screen pointer speed controller for controlling the speed of movement of the on-screen pointer between icons, according to a predetermined control signal; and a controller for receiving a signal from the key operation unit, and controlling the on-screen menu generator to generate the on-screen menu, controlling the on-screen pointer moving unit to move the on-screen pointer, and particularly controlling the speed of movement of the on-screen pointer between icons of different levels to be faster than an initially-set speed.

The controller determines the direction in which the pointer is to be moved, determines whether a menu has been displayed in the determined direction, and controls the pointer to move fast in the determined direction if it is determined in the second determination step that a menu has been displayed. The controller determines the direction of movement of the pointer by calculating a predetermined direction angle on the basis of the coordinate value of the pointer located at present.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

A preferred embodiment of the present invention takes a remote controller, and a remote controller for high-definition television (HDTV) receivers which operates according to an on-screen menu system, as concrete examples.

Figure 1:
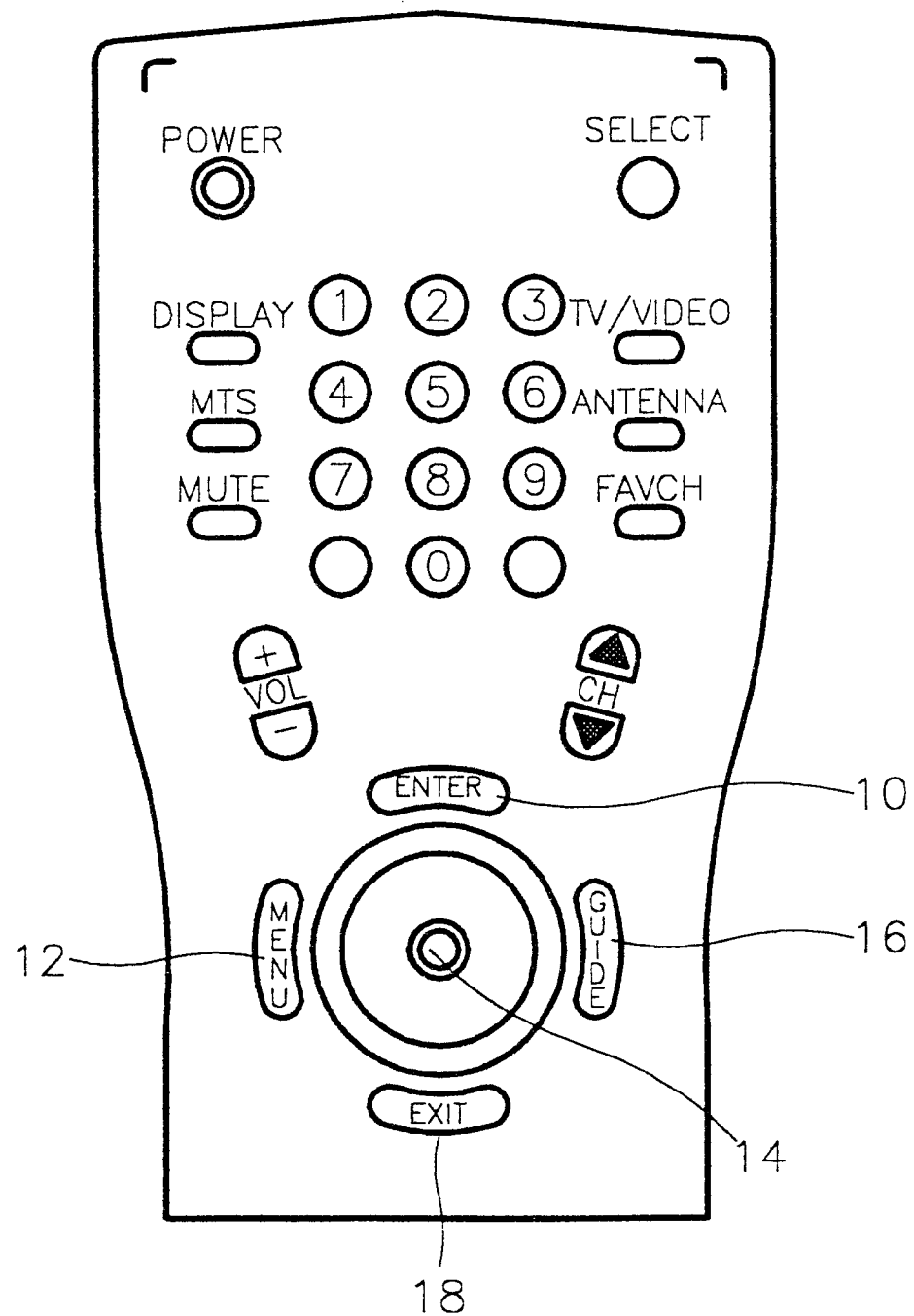
FIG. 1 is an exterior view of a remote controller for high definition televisions (HDTV)

Referring to FIG. 1 showing the exterior of a remote controller for HDTVs, reference numeral 10 denotes an enter key, reference numeral 12 denotes a menu key, reference numeral 14 denotes an I-point control key, reference numeral 16 denotes a guide key, and reference numeral 18 is an exit key.

The enter key 10 is used to select an item displayed on an on-screen menu, and the menu key 12 is used to display an on-screen menu or to exit from a previous menu.

The I-point control key 14 operates like a joystick, and provides controls so that an on-screen pointer moves in left, right, upward and downward directions. An icon pointed by the on-screen pointer can be distinguished from the other icons by changing its color to a predetermined color.

The guide key 16 represents an on-screen program guide for HDTV receivers, and the exit key 18 is used to exit from the on-screen menu.

Figure 2:
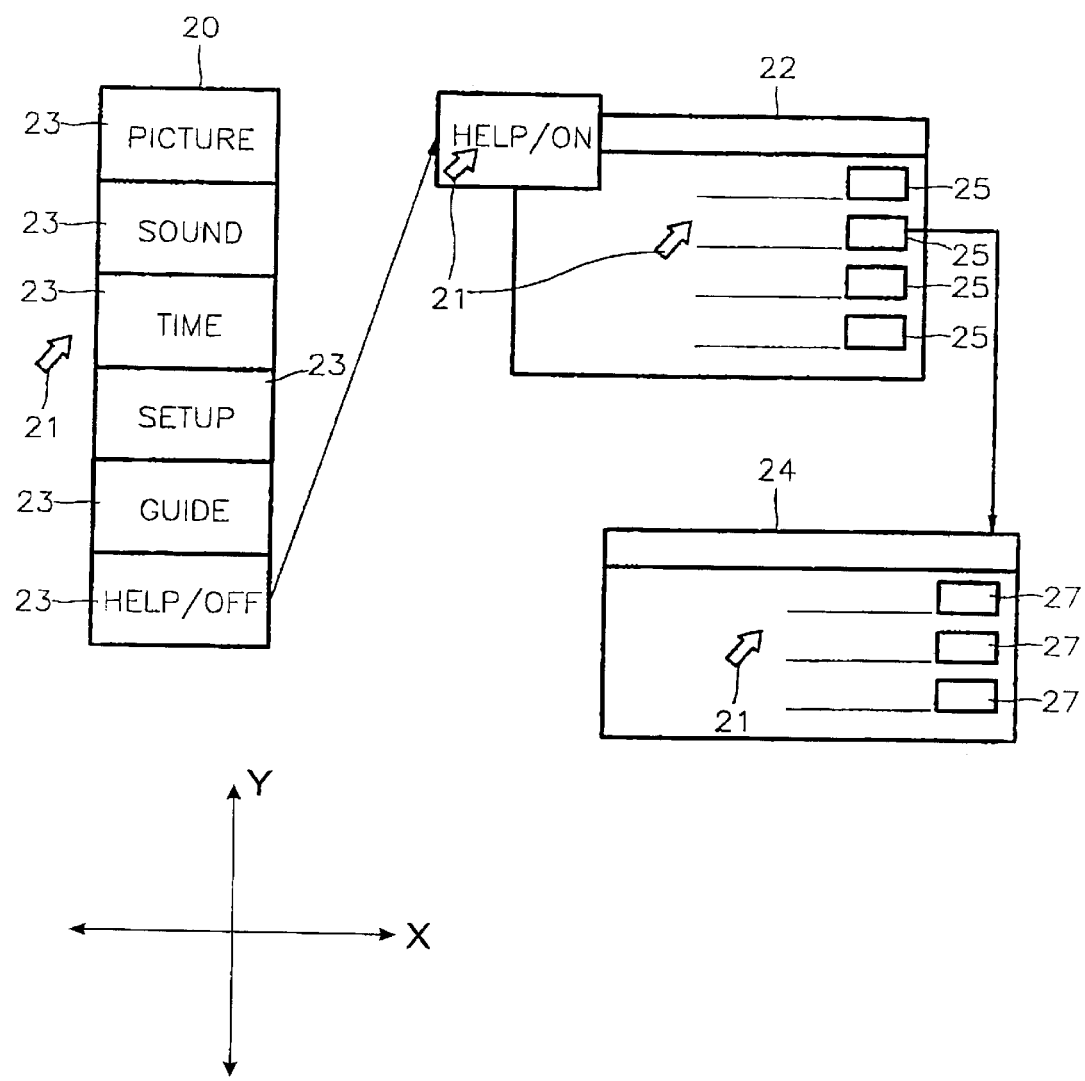
FIG. 2 is a view illustrating a multi-level on-screen menu.

Referring to FIG. 2 showing an on-screen menu, reference numerals 20, 22 and 24 denote first, second and third level menus, respectively, reference numeral 21 denotes an on-screen pointer which is controlled by the I-point control key 14, and reference numerals 23, 25 and 27 denote icons. Here, continuous display of the first level menu, the second level menu and the third level menu is called a multi-level menu. However, besides the case in which a multi-level menu is displayed, there is another case in which a separate menu screen is one-dimensionally displayed on one screen, which is not shown in the drawing.

A method of selecting an on-screen help function is taken as an example to describe the mutual operation between the remote controller of FIG. 1 and the on-screen menu of FIG. 2, which will now be described.

First, when the menu key 12 is depressed on the remote controller, the first level menu 20 shown in FIG. 2 is displayed on a screen. The on-screen pointer 21 is moved upward and downward by the control of the I-point control key 14, so that it is placed on the "Help/off" icon. Then, the enter key 10 is pressed, and the "help/off" is then changed to "help/on" and simultaneously the second level menu 22 appears.

The on-screen pointer 21 is moved to a desired icon of the icons 25 using the I-point controller 14 in the same method, and the enter key 10 is then pressed. At this time, the third level menu 24 is displayed on the screen. In this way, the enter key 10 installed on the remote controller, functions to issue a selection completion command, and acts analogously to an enter key which is used in computers.

In the prior art, the speed of movement of a pointer between icons of the same level is kept equal to that of movement of a pointer between icons of different levels. However, in the present invention, the speed of movement of a pointer between icons of the same level is made different from the speed of movement of the pointer between icons of different levels, so that the menu selection time is shortened. That is, the speed of movement of the pointer between icons of different levels is made faster than that of movement of the pointer between icons of the same level, in order to shorten the menu selection time.

Figure 3:
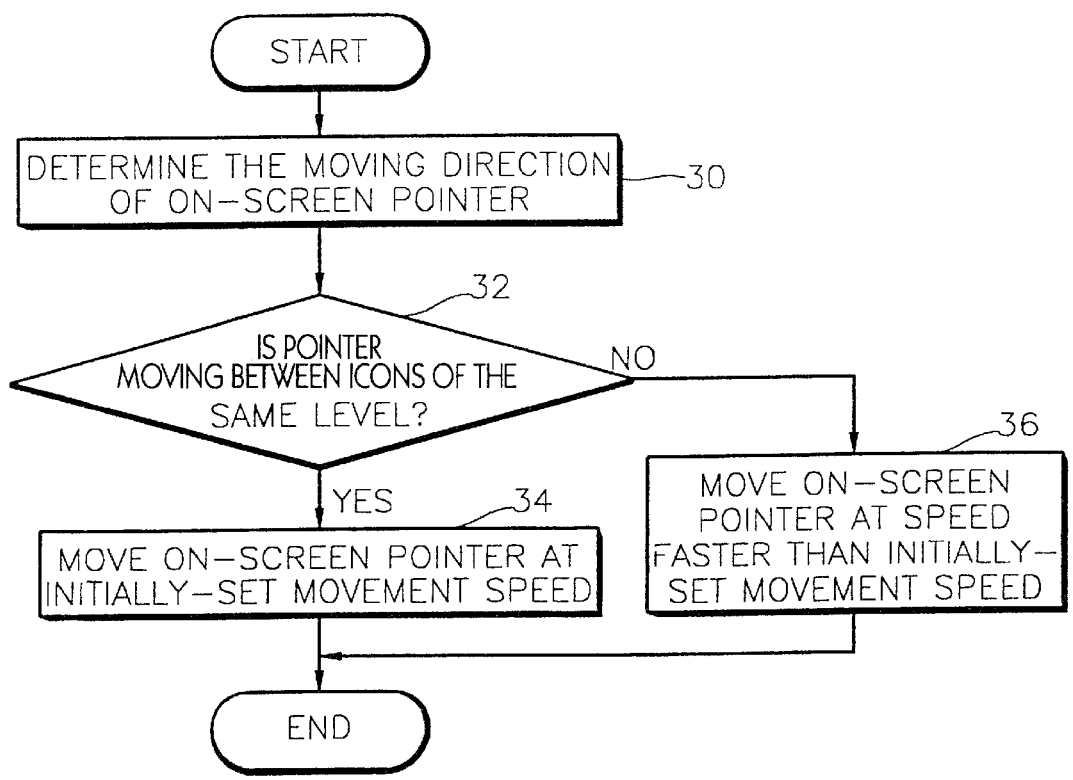
FIG. 3 is a flowchart illustrating a method of selecting in an on-screen menu of multi levels, according to the present invention.

FIG. 3 illustrates an on-screen menu selecting method according to the present invention, particularly, a method of selecting an on-screen menu which is represented in multiple levels.

The moving direction of an on-screen pointer is determined in step 30, and a determination is made as to whether the on-screen pointer moves between icons of the same level, in step 32. That is, it can be seen from FIG. 2 that the movement of the pointer between the same level is made upward and downward and the movement of the pointer between different levels is made from side to side. The on-screen pointer 21 changes coordinates whenever it moves, so that the moving direction of the pointer can be determined by the values of the changed coordinates.

In the case shown in FIG. 2, if the variation of coordinates along the X-axis direction is larger than the variation of coordinates along the Y-axis direction, the movement of the pointer is determined to be movement between icons of different levels. If a variation along the Y-axis direction is larger than that along the X-axis direction, the movement of the pointer is determined to be movement between icons of the same level.

If it is determined in step 32 that the pointer moves between icons of the same level, the on-screen pointer is moved at an initially-set movement speed, in step 34. On the other hand, if it is determined in step 32 that the pointer moves between icons of different levels, the on-screen pointer is moved at a speed faster than the initially-set movement speed, in step 36.

Figure 4:
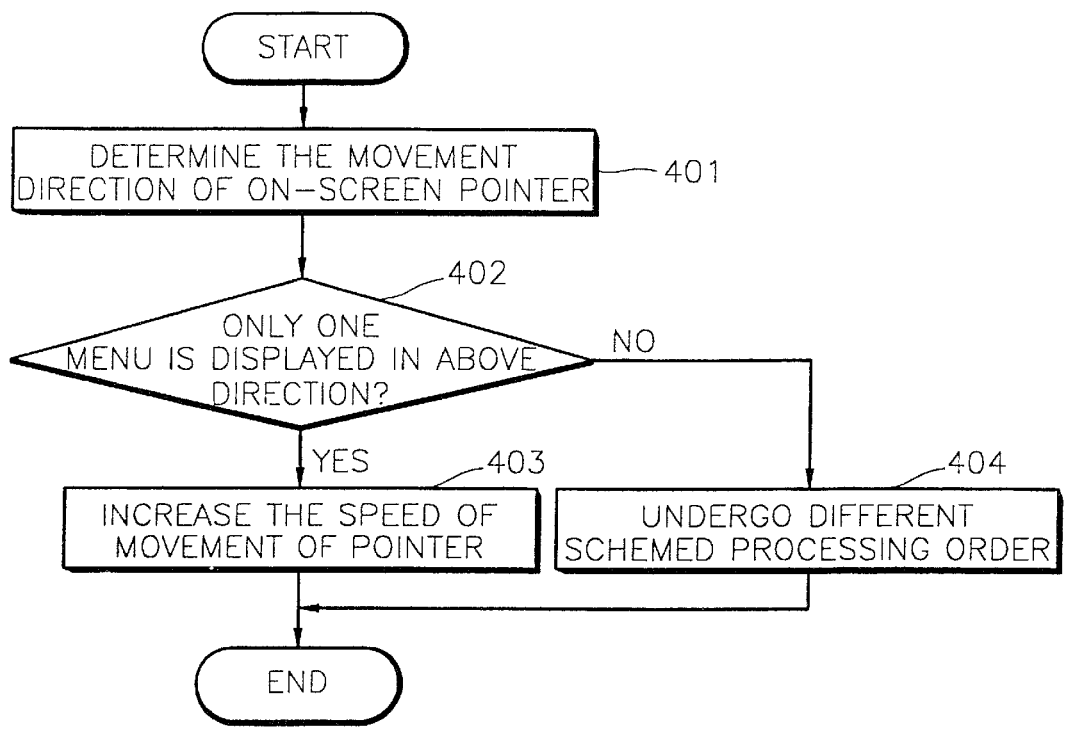
FIG. 4 is a flowchart illustrating a method of selecting in an on-screen menu, according to another embodiment of the present invention.

FIG. 4 illustrates another embodiment of an on-screen menu selecting method according to the present invention. An embodiment in which a menu is not displayed in multiple levels but a menu screen is one-dimensionally displayed will now be described.

First, the direction in which an on-screen pointer is being moved is determined in step 401. In step 402, a determination is made as to whether a menu has been displayed in the direction determined in step 401. In steps 401 and 402, how many menus are displayed within a predetermined direction angle (for example, ±60° around the direction of movement) is determined on the basis of the direction of movement of the pointer.

Figure 6:
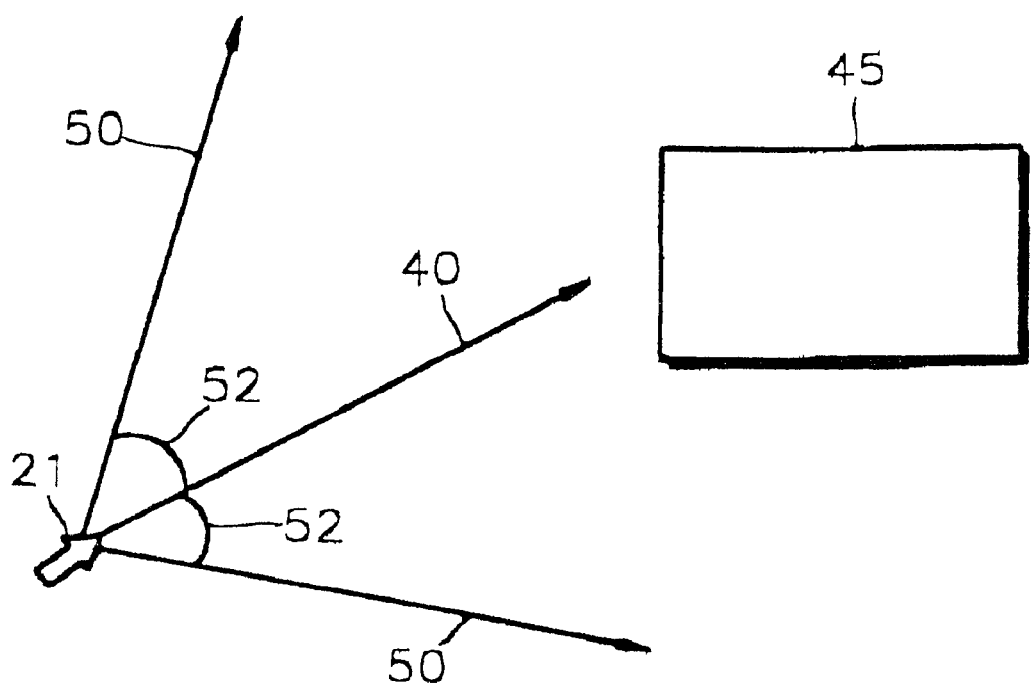
FIG. 6 is a diagram illustrating a step of a method of selecting in an on-screen menu, according to an embodiment of the present invention.

This determination is illustrated in FIG. 6. In FIG. 6, on-screen pointer 21 is moving in the direction of arrow 40. Arrows 50 indicate a predetermined direction angle which is defined by angles 52 above and below arrow 40. In the case illustrated in FIG. 6, menu 45 lies within the predetermined direction angle. Angles 52 may be set as appropriate for the displayed on-screen menu. For example, the predetermined direction angle may be defined as the angle range ±60° around the direction of movement.

If it is determined in step 402 that a menu is displayed, the pointer is controlled to move faster in the determined movement direction in step 403. On the other hand, if it is determined in step 402 that two or more menus are displayed, a different schemed processing order is carried out in step 404. This step has no relation with the present invention, and will not be described in detail.

Figure 5:
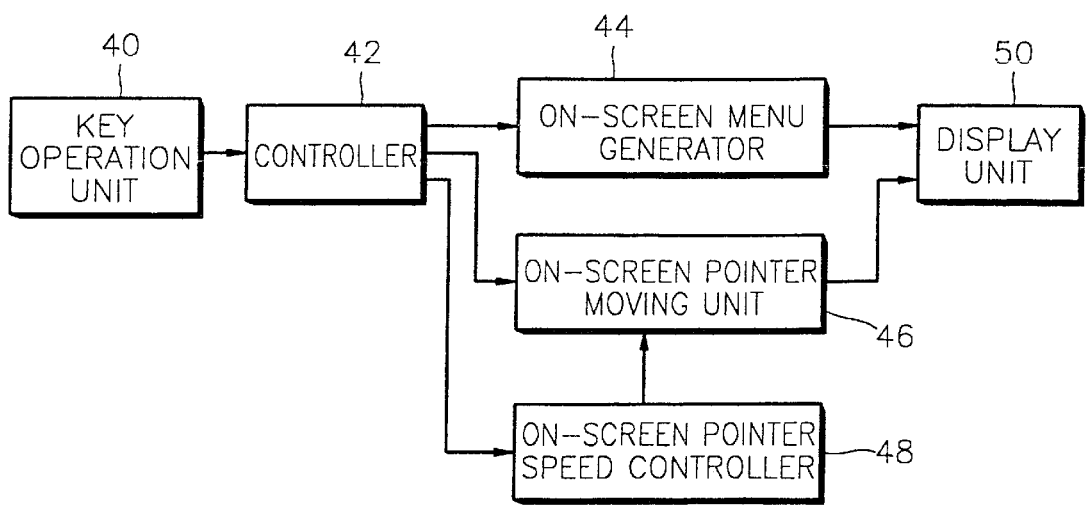
FIG. 5 is a block diagram of an on-screen menu selecting apparatus according to the present invention.

FIG. 5 shows an on-screen menu selecting apparatus according to the present invention. Referring to FIG. 5, the apparatus includes a key operation unit 40, a controller 42, an on-screen menu generator 44, an on-screen pointer moving unit 46, an on-screen pointer speed controller 48, and a display unit 50.

The key operation unit 40 has a remote controller and a key operator of a panel, particularly, has an on-screen pointer movement key for moving an on-screen pointer. The on-screen menu generator 44 generates an on-screen menu under the control of the controller 42 and provides it to the display unit 50. The on-screen pointer moving unit 46 moves the on-screen pointer under the control of the controller 42 so that the on-screen pointer corresponds to the movement of an I-pointer which is an on-screen pointer movement key. The on-screen pointer speed controller 48 controls the on-screen pointer to move between icons of different levels at a speed faster than an initially-set movement speed.

The controller 42 receives a signal from the key operation unit 40 and controls the generation of the on-screen menu and movement of the on-screen pointer. In particular, the movement of the on-screen pointer between icons of different levels is controlled to be faster than the initially-set speed. Also, the controller 42 determines the direction in which the pointer is to be moved, and determines whether a menu is displayed in the determined direction. If a menu is determined as being displayed, the pointer is controlled to move fast in the moving direction. That is, the controller 42 determines the direction in which the pointer is to be moved by calculating a predetermined direction angle on the basis of the coordinate value of a current located pointer.

According to the present invention as described above, the menu selection time is shortened by increasing the speed of movement of an on-screen pointer.

What is claimed is:

1. An on-screen menu selecting method, comprising the steps of:
   providing menus of different levels, each menu having a plurality of menu items represented by corresponding icons which are displayed in different areas of a screen and are selectable by a pointer; and
   controlling the pointer so that a speed of movement of the pointer between the icons of the different levels is faster than a speed of movement of the pointer between the icons of a same level so as to shorten a menu selection time.

2. The method of claim 1, further comprising the step of displaying an on-screen menu at multiple levels.

3. An on-screen menu selecting apparatus for selecting between menus of different levels, each menu having a plurality of menu items represented by corresponding icons which are displayed in different areas of a screen and are selectable by a pointer, said apparatus comprising:
   a key operation unit including a remote controller and a key panel, the key panel including an on-screen pointer movement key for moving an on-screen pointer;
   an on-screen menu generator for generating an on-screen menu;
   an on-screen pointer moving unit for moving the on-screen pointer in response to the movement of the on-screen pointer movement key;
   an on-screen pointer speed controller for controlling the speed of movement of the on-screen pointer between icons according to a predetermined control signal; and
   a controller for receiving a signal from the key operation unit, for controlling the on-screen menu generator to generate the on-screen menu, for controlling the on-screen pointer moving unit to move the on-screen pointer, and for controlling the on-screen pointer so that a speed of movement of the on-screen pointer between icons of the different levels is faster than an initially-set speed of movement of the on-screen pointer.

4. The apparatus of claim 3, said controller determining a direction in which the pointer is to be moved as a determined direction of movement, determining whether a menu has been displayed in the determined direction of movement, and controlling the pointer to move faster than the initially-set speed in the determined direction of movement when it is determined that a menu has been displayed.

5. The apparatus of claim 4, said controller determining whether a menu has been displayed in the determined direction of movement by determining whether the menu is displayed in a region defined by a predetermined direction angle located on both sides of the determined direction of movement.

6. An on-screen menu selection method, comprising the steps of:
   providing menus of different levels, each menu having a plurality of menu items represented by corresponding icons which are displayed in different areas of a screen and are selectable by a movable pointer;
   displaying a multilevel on-screen menu and the moveable pointer on the screen;
   moving the movable pointer in response to a control key;
   determining a variation in X coordinate values and a variation in Y coordinate values of the movable pointer so as to determine a moving direction of the movable pointer; and
   adjusting a speed of movement of the movable pointer as a function of whether the variation in the X coordinate values is greater than or less than the variation in the Y coordinate values.

7. The method of claim 6, the step of adjusting the speed of movement of the movable pointer further comprising the steps of:
   moving the movable pointer at a first speed when the variation in the Y coordinate values is greater than the variation in the X coordinate values; and
   moving the movable pointer at a second speed when the variation in the X coordinate values is greater than the variation in the Y coordinate values.

8. The method of claim 7, the second speed being faster than the first speed.

9. The method of claim 8, the step of displaying the multilevel on-screen menu further comprising the step of:
   displaying a menu in which icons of a same level are displayed vertically with respect to each other, and icons of different levels are displayed at corresponding different horizontal positions relative to each other.

10. An on-screen menu selecting apparatus for selecting between menus of different levels, each menu having a plurality of menu items represented by corresponding icons which are displayed in different areas of a screen and are selectable by a pointer, said apparatus comprising:
    a display unit for displaying an on-screen menu;
    an on-screen menu generator connected to the display unit;
    a controller connected to the on-screen menu generator for controlling the on-screen menu generator;
    a key operation unit connected to the controller, the key operation unit comprising:
    a remote controller; and
    a pointer movement key for directing movement of an on-screen pointer;
    an on-screen pointer moving unit connected to the controller and to the display unit for controlling the movement of the on-screen pointer under control of the controller in response to a signal from the pointer movement key; and
    an on-screen pointer speed controller connected to the controller and to the on-screen pointer moving unit for controlling the on-screen pointer to move at corresponding different speeds so that a speed of movement of the on-screen pointer between a same level of icons is different from a speed of movement of the on-screen pointer between different levels of icons.

11. The apparatus of claim 10, the controller further comprising:
    means for determining a direction in which the on-screen pointer is moving as a determined direction of movement; and
    means for controlling the on-screen pointer speed controller as a function of the determined direction of movement.

12. The apparatus of claim 10, the pointer movement key being an I-point control key.

13. An on-screen menu selecting method for selecting between menus of different levels, each menu having a plurality of menu items represented by corresponding icons which are displayed in different areas of a screen and are selectable by an on-screen pointer, said method comprising the steps of:
    generating an on-screen menu;
    moving the on-screen pointer; and
    controlling the on-screen pointer so that a speed of movement of the on-screen pointer between icons of the different levels is faster than an initially-set speed of movement of the on-screen pointer.

14. The method of claim 13, further comprising the steps of:

determining a direction in which the on-screen pointer is to be moved as a determined direction of movement;

determining whether a menu has been displayed in the determined direction of movement; and controlling the on-screen pointer to move faster than the initially-set speed in the determined direction of movement when it is determined that a menu has been displayed.

15. The method of claim 14, wherein the step of determining whether a menu has been displayed in the determined direction of movement comprises determining whether the menu is displayed in a region defined by a predetermined direction angle located on both sides of the determined direction of movement.

16. The method of claim 13, wherein the speed of movement of the on-screen pointer between the icons of the different levels is faster than the speed of movement of the on-screen pointer between icons of the same level.

17. An on-screen menu selecting method for selecting between menus of different levels, each menu having a plurality of menu items represented by corresponding icons which are displayed in different areas of a screen and are selectable by a pointer, said method comprising the steps of:

displaying an on-screen menu;

displaying an on-screen pointer for movement on the screen; and controlling the on-screen pointer to move at corresponding different speeds so that a speed of movement of the on-screen pointer between a same level of icons is different from a speed of movement of the on-screen pointer between different levels of icons.

18. The method of claim 17, further comprising the steps of:

determining a direction in which the on-screen pointer is moving as a determined direction of movement; and controlling the speed of movement of the on-screen pointer as a function of the determined direction of movement.

19. The method of claim 17, wherein the speed of movement of the on-screen pointer between the icons of the different levels is faster than the speed of movement of the on-screen pointer between icons of the same level.

* * * * *